(12) United States Patent
Pate

(10) Patent No.: US 10,061,510 B2
(45) Date of Patent: *Aug. 28, 2018

(54) GESTURE MULTI-FUNCTION ON A PHYSICAL KEYBOARD

(71) Applicant: AT&T Intellectual Property I, L.P., Atlanta, GA (US)

(72) Inventor: Eric Pate, Cumming, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/438,025

(22) Filed: Feb. 21, 2017

(65) Prior Publication Data

US 2017/0160927 A1 Jun. 8, 2017

Related U.S. Application Data

(63) Continuation of application No. 14/554,156, filed on Nov. 26, 2014, now Pat. No. 9,619,043.

(51) Int. Cl.
*G06F 3/0488* (2013.01)
*G06F 3/0489* (2013.01)

(52) U.S. Cl.
CPC ........ *G06F 3/04886* (2013.01); *G06F 3/0489* (2013.01); *G06F 3/04883* (2013.01)

(58) Field of Classification Search
CPC ...... G06F 3/02; G06F 3/0205; G06F 3/04886; G06F 3/0488; G06F 3/04883; G06F 3/0487

See application file for complete search history.

(56) References Cited

U.S. PATENT DOCUMENTS

| | | | |
|---|---|---|---|
| 6,094,197 A * | 7/2000 | Buxton | G06F 3/0482 341/22 |
| 7,705,830 B2 | 4/2010 | Westerman et al. | |
| 7,880,727 B2 | 2/2011 | Abanami et al. | |
| 8,319,742 B2 | 11/2012 | Doktorova et al. | |
| 8,335,993 B1 | 12/2012 | Tan | |
| 8,405,601 B1 | 3/2013 | Beale | |
| 8,542,206 B2 | 9/2013 | Westerman et al. | |

(Continued)

FOREIGN PATENT DOCUMENTS

KR 2010049361 A 5/2010

OTHER PUBLICATIONS

Hirche, Johannes, et al. "Adaptive interface for text input on large-scale interactive surfaces." Horizontal Interactive Human Computer Systems, 2008. Tabletop 2008. 3rd IEEE International Workshop on. IEEE, 2008.

(Continued)

*Primary Examiner* — Kenneth Bukowski

(57) ABSTRACT

A computer keyboard includes position sensors such as capacitive sensors on each of the keys for monitoring positions of fingertips on the keys. A processor receives an indication of contact of a finger on a surface of a key, including an identity of the key and an indication of a position of the contact on the surface. The processor also receives an indication of a motion gesture comprising displacement of the position of the contact on the surface of the key. Using the identity of the key and the indication of the motion gesture, an input from a human operator is determined.

20 Claims, 7 Drawing Sheets

(56) References Cited

U.S. PATENT DOCUMENTS

| | | | |
|---|---|---|---|
| 8,643,615 B2 | 2/2014 | Adamson et al. | |
| 8,760,425 B2 | 6/2014 | Crisan | |
| 9,041,652 B2* | 5/2015 | Elias | G06F 3/044 341/22 |
| 9,092,068 B1* | 7/2015 | Hamburgen | G06F 3/0489 |
| 2003/0107557 A1* | 6/2003 | Liebenow | G06F 3/038 345/173 |
| 2006/0119582 A1 | 6/2006 | Ng et al. | |
| 2008/0156172 A1 | 7/2008 | Tohgi | |
| 2008/0158172 A1* | 7/2008 | Hotelling | G06F 1/3231 345/173 |
| 2009/0179780 A1 | 7/2009 | Tambe | |
| 2010/0148995 A1* | 6/2010 | Elias | G06F 3/0202 341/22 |
| 2010/0259482 A1* | 10/2010 | Ball | G06F 3/0219 345/168 |
| 2011/0109561 A1 | 5/2011 | Lee et al. | |
| 2011/0302518 A1* | 12/2011 | Zhang | G06F 3/0234 715/773 |
| 2012/0036434 A1* | 2/2012 | Oberstein | G06F 3/0482 715/702 |
| 2012/0110518 A1 | 5/2012 | Chan et al. | |
| 2012/0113008 A1* | 5/2012 | Makinen | G06F 3/016 345/168 |
| 2012/0119997 A1 | 5/2012 | Gutowitz | |
| 2012/0306767 A1 | 12/2012 | Campbell | |
| 2013/0019205 A1* | 1/2013 | Gil | G06F 3/04812 715/834 |
| 2013/0063286 A1 | 3/2013 | Elias | |
| 2014/0078063 A1 | 3/2014 | Bathiche et al. | |
| 2014/0123049 A1* | 5/2014 | Buxton | G06F 3/04886 715/773 |
| 2014/0123051 A1 | 5/2014 | Ni | |
| 2014/0191972 A1 | 7/2014 | Case et al. | |
| 2014/0241780 A1 | 8/2014 | Knighton et al. | |
| 2014/0298266 A1 | 10/2014 | Lapp | |
| 2016/0048290 A1* | 2/2016 | Zhang | G06F 3/044 345/168 |

OTHER PUBLICATIONS

Findlater, Leah, and Jacob O. Wobbrock. "From plastic to pixels: in search of touch-typing touchscreen keyboards." interactions 19.3 (2012): 44-49.

* cited by examiner

GESTURE MULTI-FUNCTION ON A PHYSICAL KEYBOARD

CROSS REFERENCE TO RELATED APPLICATIONS

This application is a continuation of U.S. patent application Ser. No. 14/554,156, entitled "GESTURE MULTI-FUNCTION ON A PHYSICAL KEYBOARD," filed on Nov. 26, 2014, issued as U.S. Pat. No. 9,619,043 on Apr. 11, 2017, the disclosure of which is incorporated herein by reference in their entirety.

TECHNICAL FIELD

The present disclosure relates to a computer keyboard. More specifically, the disclosure is directed to the use of gestures made on the surfaces of keys of a physical keyboard to enhance the interpretation of keystrokes.

BACKGROUND

As computers have become more complex, so have the keyboards used to control them.

A standard keyboard configuration, such as the configuration 100 shown in FIG. 1, includes a plurality of binary keys; i.e., key that have two positions: "up" (not depressed) and "down (depressed). Most keys, when depressed, indicate an input of a letter of an alphabet, a numeral or another symbol. For example, the key 105 indicates an input of a lowercase "a" on an English language keyboard. As used herein, an "unmodified" character means a character such as a lower case character that is input through a standard keyboard when a key is depressed or touched without simultaneously depressing or touching another key.

On a standard keyboard, a SHIFT key 110 is used to modify the input by depressing the SHIFT key simultaneously with another key. That technique permits a single key to be used in inputting multiple characters. In the case of the key 105, simultaneously depressing the SHIFT key indicates an input of an uppercase "A."

Additional keys for modifying the meaning of the basic or unmodified input keys have been added as computer functionality has become more complex. For example, a CTRL key 115 and an ALT key 120 are used to further modify the meaning of the unmodified input keys.

While soft buttons in touch interfaces have somewhat reduced complexity, physical interfaces such as keyboards continue to grow more complex. There is therefore a need to increase the flexibility of keyboards while simultaneously reducing the number of keys as well as increase typing speed.

SUMMARY

The needs existing in the field are addressed by the present disclosure, which relates to gesture multi-function capabilities on a keyboard. In embodiments of the invention, a method is provided for receiving input from a human operator. An indication of contact of a finger on a surface of a keyboard key is received. The indication of contact includes an identity of the keyboard key and an indication of a position of the contact on the surface. The keyboard key is one of a plurality of keyboard keys, each representing one or more of a plurality of characters.

An indication of a motion gesture is next received, comprising displacement of the position of the contact on the surface of the keyboard key. The input from the human operator is determined using the identity of the keyboard key and the indication of the motion gesture.

In embodiments, the motion gesture is a finger swipe in contact with a surface of the keyboard key.

In additional embodiments of the present disclosure, determining the input from the human operator further includes, only upon determining that the motion gesture comprises a path beginning within a null zone near a center of the surface of the keyboard key and subsequently exiting the null zone, determining the input to be a character represented by the keyboard key and modified in accordance with a direction in which the path exits the null zone.

In additional embodiments, a non-transitory computer-usable medium is provided having computer readable instructions stored thereon that, when executed by a processor, cause the processor to perform the above-described operations.

In other embodiments of the present disclosure, a keyboard is provided for receiving input from a human operator. The keyboard includes a key array comprising at least 26 keys, each representing one letter in a standard alphabet. Each key of the 26 keys comprises a location sensor capable of sensing a location of a fingertip of the human operator on the key. The keyboard further comprises at least one processor and at least one computer readable storage device having stored thereon computer readable instructions that, when executed by the at least one processor, cause the at least one processor to determine the input from the human operator using a signal indicative of a selection of one of the keys by the human operator and a signal from the location sensor indicative of a motion gesture by the human operator.

The respective objects and features of the disclosure may be applied jointly or severally in any combination or sub combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EXEMPLARY EMBODIMENTS

In accordance with the presently disclosed systems and methods, the individual keys in a keyboard are equipped with a touch or position sensor on the upper surfaces. The keyboard is thereby capable of detecting finger swipes or taps in addition to regular keystrokes.

Figure 1:
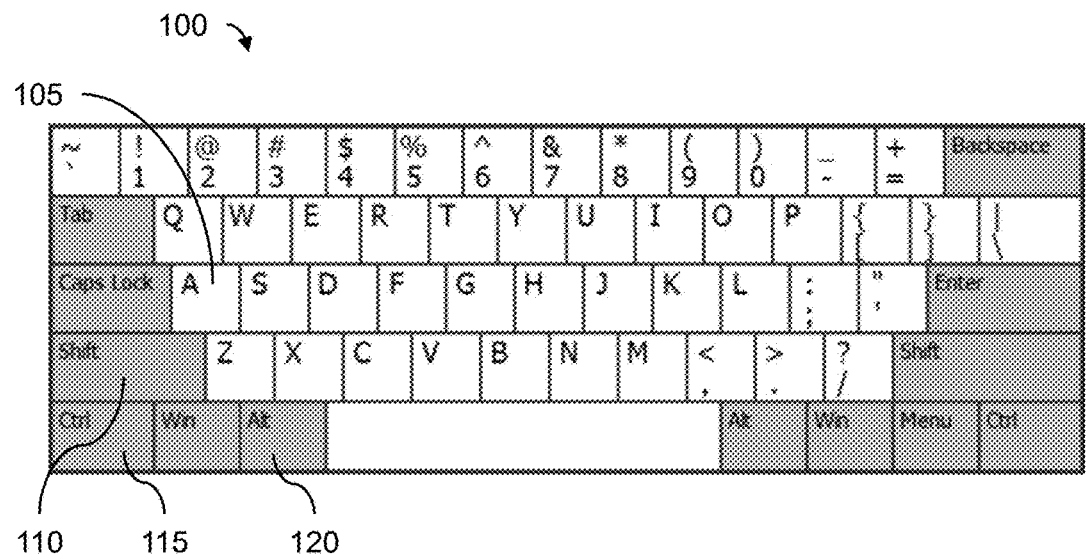
FIG. 1 is a plan view illustrating a keyboard according to embodiments of the disclosure.
Figure 2A:
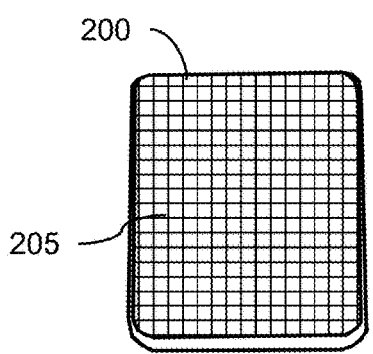
FIG. 2A is a perspective view of a keyboard key according to embodiments of the disclosure.
Figure 2B:
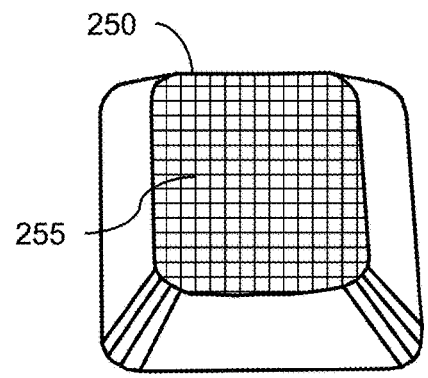
FIG. 2B is a perspective view of a keyboard key according to other embodiments of the disclosure.

The disclosed keyboard may be a mechanical keyboard; i.e., a keyboard in which separate, moving keys are activated by depressing the keys with a finger. The downward motion of the activated key triggers a switch that signals a keyboard controller that the key is depressed. As shown in FIG. 2, a key 200 having a flat top surface is equipped with a capacitive position sensor 205. Such keys are often used in compact notebook computers. The flat top surface is particularly receptive to mounting a capacitive position sensor 205, which is typically manufactured as a flat component. Alternatively, as shown in FIG. 2B, a keyboard key 250 having a concave or otherwise curved top surface may be fitted with a curved position sensor 255.

The position sensors may be manufactured separately and later mounted to or embedded in the individual key, or may be manufactured as an integral part of the keyboard key. Electrical connections between the position sensors and a keyboard control processor are made below the keys, using, for example, flexible printed circuits.

In one embodiment, the position sensor is a capacitive sensor such as those used in typical touchscreen panels. Such a position sensor includes an insulator such as glass, coated with a transparent conductor such as indium tin oxide (ITO). When a user's fingertip touches the surface of the screen, a distortion of the screen's electrostatic field results, which is measurable as a change in capacitance. Various technologies may be used to determine the location of the touch. The location is then sent to the keyboard control processor.

While the present disclosure refers to capacitive position sensors, the position sensors may alternatively use another tactile or non-contact sensing technology, including resistive panels, surface acoustic wave technology, an infrared grid, infrared acrylic projection, optical imaging, dispersive signal technology and acoustic pulse recognition. The technology used in a particular application may be chosen based on price, durability in adverse environments, precision and other factors.

The presently disclosed techniques may also be applied to virtual keyboards displayed on capacitive or other touchscreens, on which a touch within a two-dimensional representation of a key is interpreted by the touchscreen processor in the same way as a key depression on a mechanical keyboard.

Figure 3A:
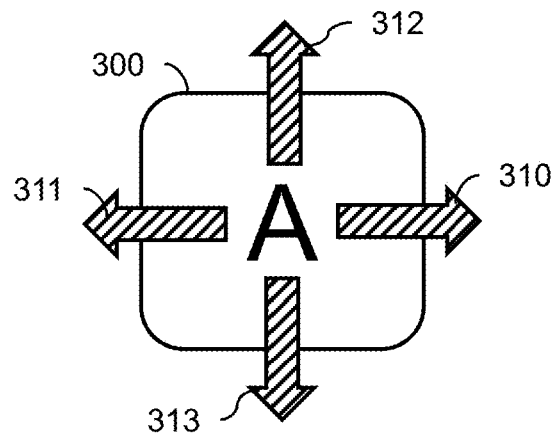
FIG. 3A is a schematic diagram showing motion gestures on a keyboard key according to embodiments of the disclosure.
Figure 3B:
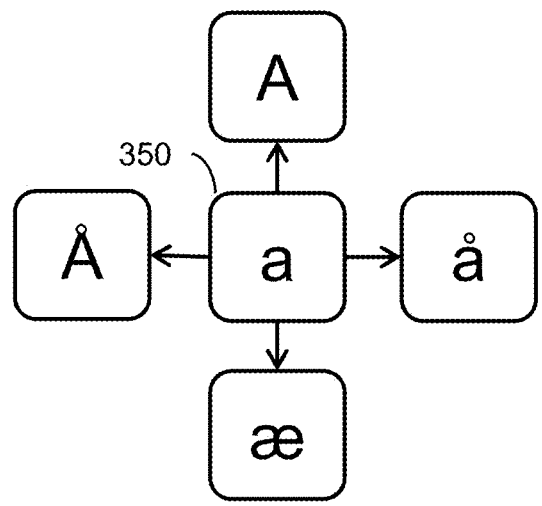
FIG. 3B is a schematic diagram showing character inputs resulting from motion gestures according to embodiments of the disclosure.

In accordance with the present disclosure, the position sensor on each key is used to detect a motion gesture performed immediately after, or in conjunction with, the tapping of a key. In one example depicted in FIG. 3A, while depressing a key 300, or immediately afterward, a user's finger may be swiped to the right, left, top or bottom, as indicated by the arrows 310, 311, 312, 313. Including a "tip" without a "swipe," the individual key 300 can therefore have five different meanings depending on the motion of the user's finger. For example, as shown diagrammatically by the representation of an "a" key 350 in FIG. 3B, tapping the key without swiping signals an unmodified "a." If the key is swiped up, an uppercase "A" is indicated. If the key is swiped down, the controller interprets the symbol "æ." Swiping left and right produce "Ä" and "å," respectively. It can be seen that the various motion gestures, coupled to a particular key, tie that key to special characters, functions, commands, or macros.

The motion gesture recognition as described herein may eliminate the need for the SHIFT, ALT and CTRL keys, while providing a more intuitive and potentially faster user interface. The resulting keyboard footprint is significantly reduced while increasing functionality. The footprint reduction may be especially beneficial for "ultra books" and other smaller laptops that have physical keyboards and where space is at a premium.

Figure 4:
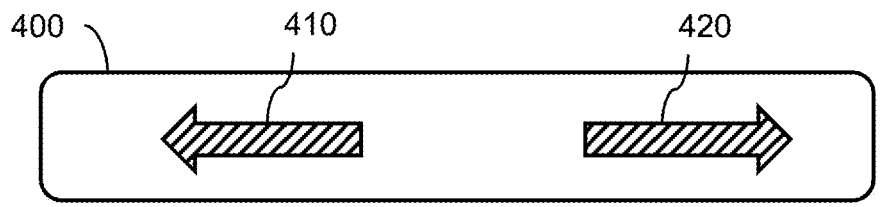
FIG. 4 is a schematic diagram showing motion gestures on a spacebar key according to embodiments of the disclosure.

In another example, heavily used functions may be tied to easily performed motion gestures. The space bar 400 (FIG. 4) of a standard keyboard is positioned for quick and easy access by both hands when the hands are placed in a typing position. In accordance with embodiments of the present disclosure, a position sensor is incorporated in the space bar to sense lateral swipes to the left 410 and to the right 420. Those motion gestures may, for example, be interpreted as TAB+ and TAB−, respectively. That fast and fluid input of the TAB functions is especially useful to programmers who use those keys heavily.

Figure 5A:
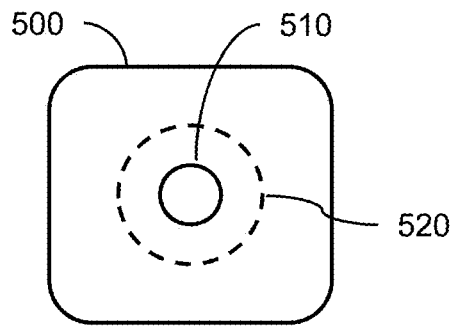
FIGS. 5A, 5B, 5C are schematic diagrams showing motion gestures on a keyboard key according to embodiments of the disclosure.
Figure 5B:
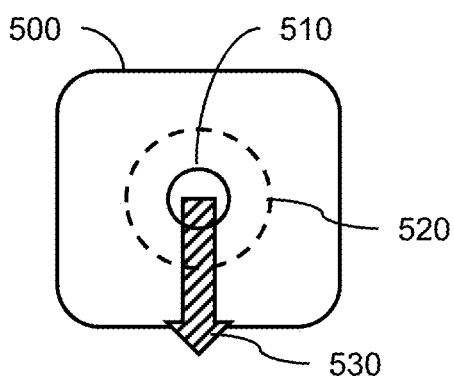
Figure 5C:
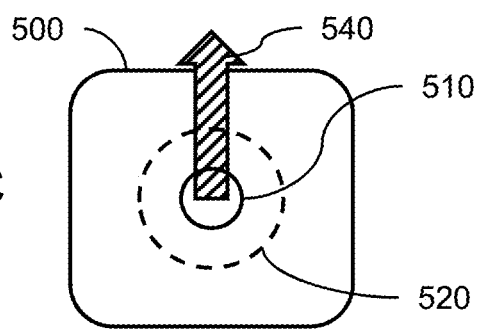

The interpretation of a signal from the embedded position sensor is arranged to differentiate between a simple tap of the key and a swipe or motion gesture. Referring to FIGS. 5A-5C, a sensor on the top surface of a key 500 detects an initial contact region 510 between a fingertip and the key surface. The disclosed technique further recognizes a null zone 520. If the region of contact 510 remains within the null zone 520 for the duration of the contact, then the event is classified as a tap, and not a swipe or other motion gesture. The null zone may be statically defined as a fixed region on the top surface of the key 500. Alternatively, the null zone 520 may be defined dynamically as an area of fixed radius surrounding a centroid of the initial contact region 510. By dynamically locating the null zone 520 based on the location of the initial contact region 510, taps may be differentiated from swipes independently of where on the key surface the initial contact occurred.

An event is interpreted as a swipe if, after an initial contact region 510 is defined within a null zone 520 by contact between the sensor and the user's finger, the contact region is subsequently caused to exit the null zone by a motion gesture, as shown in FIG. 5B (a downward swipe 530) and 5C (an upward swipe 540).

The measurement ranges of the position sensors are limited to the top surfaces of the keys, where the sensors are installed. Once a target key is depressed, activations of other position sensors, located on keys other than the target key, are ignored. The system therefore ignores brushes of other fingers on other keys, processing information only from the depressed key.

Figure 6:
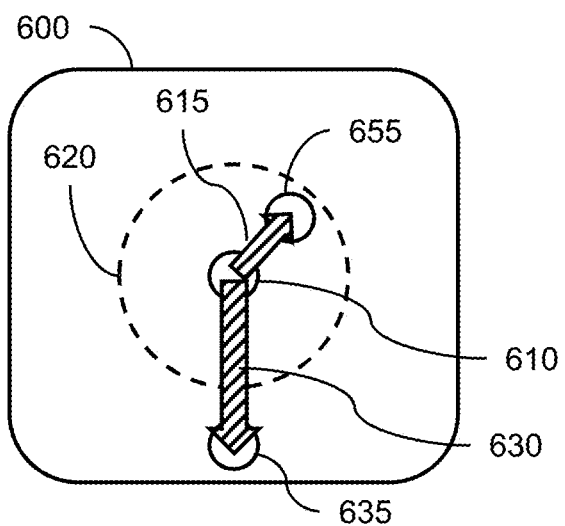
FIG. 6 is a schematic diagram showing motion gestures and a null zone on a keyboard key according to embodiments of the disclosure.

A differentiation between a tap and a swipe is further explained with reference to the key 600 of FIG. 6. When the key 600 is initially depressed, a contact area 610 between the finger and the key is sensed by the system. The contact area may drift a small amount, as shown by arrow 615, to a position such as position 655, in cases where no swipe is intended. As long as the contact area 610 does not exit the null zone 620, no swipe is detected. A longer path 630, resulting in the area of contact reaching a position 635 outside the null zone 620, is interpreted as a swipe.

Figure 7:
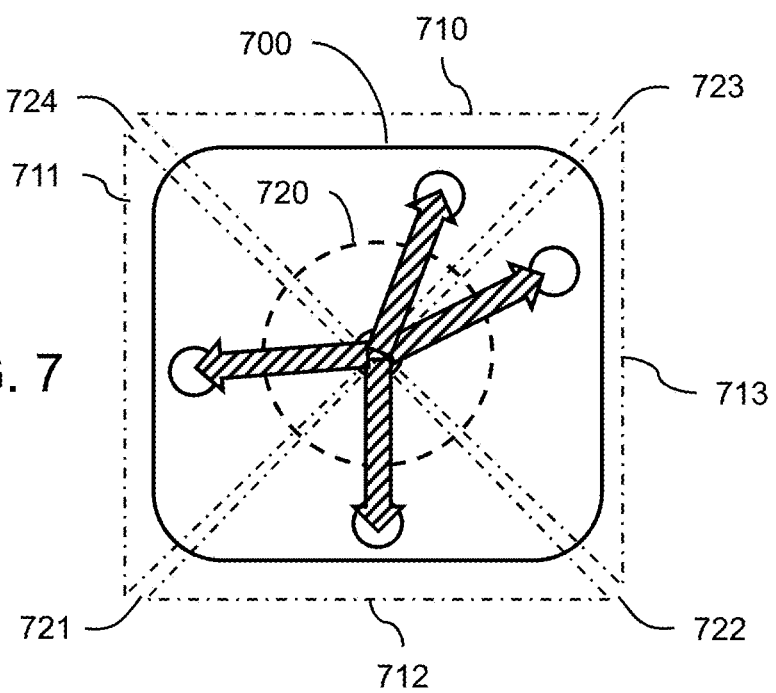
FIG. 7 is a schematic diagram showing motion gestures and multiple null zones on a keyboard key according to embodiments of the disclosure.

As noted above, a direction of a swipe on a given key may be used by the system to interpret the swipe. In embodiments, a key 700 (FIG. 7) is divided into quadrants 710, 711, 712, 713. As described above, a swipe into a particular quadrant outside the null zone 720 causes the output character of the underlying key to be modified or replaced according to the quadrant. For example, a swipe to quadrant 710 may indicate an uppercase character, while swipes to quadrants 711, 712, 713 may indicate special characters.

The quadrants 710, 711, 712, 713 are separated by additional null zones 721, 722, 723, 724. In embodiments, swipes having end points falling within those null zones are ignored. In that way, inconclusive or ambiguous swipes are not interpreted as intentional modifications to the underlying keyboard characters.

Figure 8:
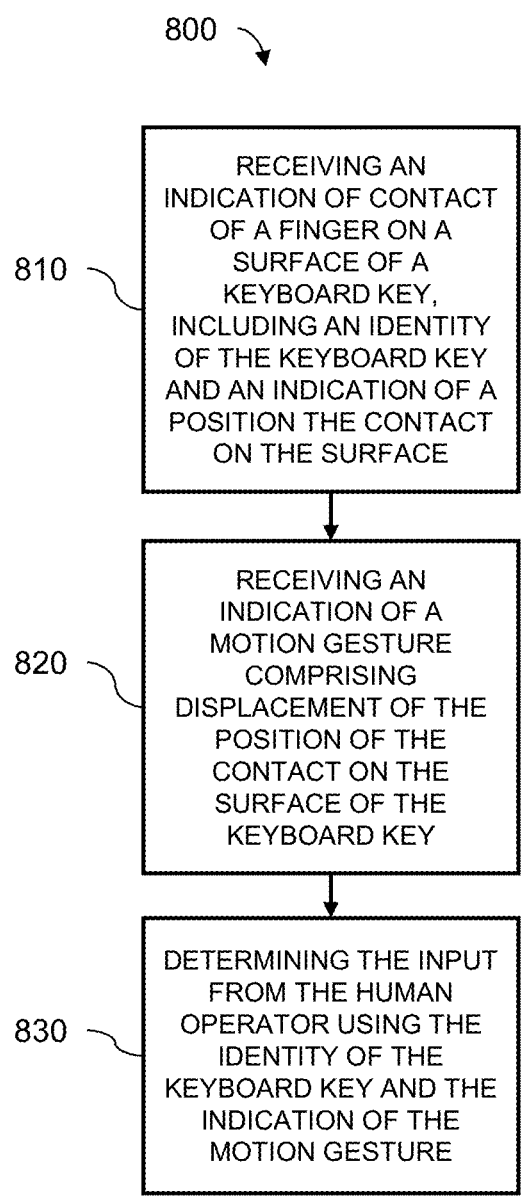
FIG. 8 is a flow chart showing operations according to embodiments of the disclosure.

A method 800 for receiving input from a human operator in accordance with the above disclosure will now be described with reference to FIG. 8. The method is performed by a processor in a system as described below. An indication of contact of a finger on a surface of a keyboard key is initially received at block 810. The indication of contact includes an identity of the keyboard key and an indication of a position the contact on the surface. The keyboard key is one of a plurality of keyboard keys, each representing one or more of a plurality of characters. In embodiments, the indication of contact may include an indication that a mechanical key is depressed, or may be an indication of a contact on a defined area of a touch screen. The indication of position is based on an output of sensor such as a capacitive sensor located on or embedded in the keyboard key.

An indication of a motion gesture is then received at block 820. The indication comprises a displacement of the position of the contact on the surface of the keyboard key. The indication of motion is based on an output of a sensor such as a capacitive sensor located on or embedded in the keyboard key. The motion gesture may, for example, be a movement of the indication of position to a location outside a null zone in which the initial indication of position is located.

The input from the human operator is determined at block 830 using the identity of the keyboard key and the indication of the motion gesture. In one example, a direction of the motion gesture from the initial point of contact is considered. Upward motion on the key, for example, may indicate input of an uppercase character.

The presently described arrangement may be implemented as a keyboard peripheral device including a processor for performing operations for receiving input from a human operator. Alternatively, the processing may be shared between a dedicated processor associated with the keyboard and a processor within the computer to which the keyboard is connected. Finally, position data may be transmitted from the keyboard to the computer where all operations are performed.

Figure 9:
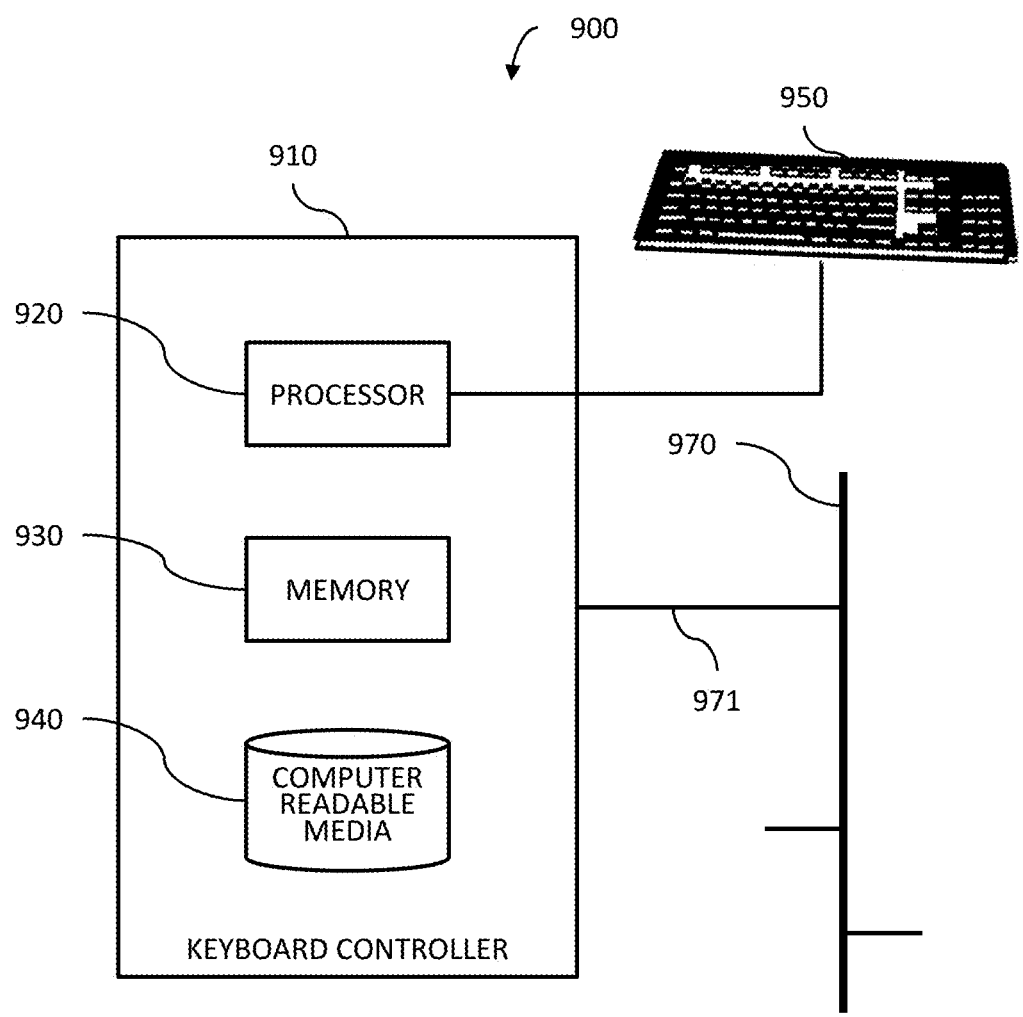
FIG. 9 is a block diagram showing one system architecture according to embodiments of the disclosure.

One such system for receiving input from a human operator as described above may be implemented in hardware such as the exemplary system 900 is shown in FIG. 9.

A computing apparatus 910 may, as noted above, be a dedicated processor within a keyboard 950, or may be a mainframe computer, a desktop or laptop computer or any other device or group of devices capable of processing data. The computing apparatus 910 receives data from the keyboard 950, including key selection data and fingertip position data. The computing apparatus outputs information via an interface 971 to a computer bus 970, where the information is routed via the I/O functions of the computer to which the keyboard is connected. As noted, the computing apparatus 910 may alternatively be partially or fully integrated with processors of the computer to which the keyboard 950 provides an input.

The computing apparatus 910 includes one or more processors 920 such as a central processing unit (CPU) and further includes a memory 930. The processor 920 is configured using software according to the present disclosure.

The memory 930 functions as a data memory that stores data used during execution of programs in the processor 920, and is also used as a program work area. The memory 930 may also function as a program memory for storing a program executed in the processor 920. The program may reside on any tangible, non-volatile computer-readable media 940 as computer readable instructions stored thereon for execution by the processor to perform the operations.

Generally, the processor 920 is configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude propagated signals, which are not tangible and are not non-transitory. Cached information is considered to be stored on a computer-readable medium. Common expedients of computer-readable media are well-known in the art and need not be described in detail here.

Implementation of the above-described arrangement results in a reduced key count in a given keyboard, by eliminating one or more of the SHIFT, ALT and CTRL keys and by utilizing existing keys for an increased number of functions. The overall footprint of the keyboard may thereby be reduced and the keyboard simplified. By eliminating the need to depress two keys at a time, it is believed that a faster typing speed may be realized. By expanding the available input pool for passwords, there is furthermore the potential to increase system security. The expanded keyboard functionality is useful to foreign users, computer programmers and others who more often use nonstandard characters and symbols.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A method for receiving input from a human operator, comprising:
   receiving an indication of contact of a finger on a representation of a first key of a virtual keyboard displayed on a touchscreen, including an indication of a position of the contact on the representation of the first key, the representation of the first key being one of a plurality of representations of keys of the virtual keyboard, each representing one or more of a plurality of characters;
   in response to receiving the indication of the contact of the finger on the representation of the first key, ignoring indications of contact on other representations of keys of the virtual keyboard;
   receiving an indication of a motion gesture comprising displacement of the position of the contact on the representation of the first key, the displacement beginning in a statically defined fixed null zone near a center of the representation of the first key and subsequently exiting the fixed null zone, the displacement ending in one of a plurality of quadrants surrounding and adjacent to the fixed null zone;
   determining the input from the human operator as a character represented by the representation of the first key and modified in accordance with the one of the quadrants in which the displacement ends;
   receiving an indication of a second contact;
   receiving an indication of a second motion gesture comprising a second displacement of a position of the second contact, the second displacement beginning in the statically defined fixed null zone and subsequently exiting the fixed null zone, the second displacement ending in a second null zone adjacent the fixed null zone and separating radial edges of two adjacent quadrants of the quadrants surrounding the fixed null zone; and
   ignoring the indication of a second motion gesture based on the second displacement ending in the second null zone.

2. The method of claim 1, wherein the motion gesture is a finger swipe in contact with the representation of the first key.

3. The method of claim 2, wherein the finger swipe is an upward swipe, and determining the input from the human operator further comprises:
   based on the upward swipe, performing a SHIFT operation on a character represented by the representation of the first key.

4. The method of claim 1, wherein receiving an indication of a motion gesture comprises receiving a signal from the touchscreen.

5. The method of claim 1, wherein the representation of the first key represents a space bar, the motion gesture is a swipe, and the input from the human operator is determined to be a tab command.

6. The method of claim 1 wherein determining the input from the human operator further comprises:
   only upon determining that the motion gesture comprises a path beginning within a null zone near a center of the representation of the first key and remaining within the null zone, determining the input to be an unmodified character represented by the representation of the first key.

7. The method of claim 1, wherein the virtual keyboard does not include a SHIFT key.

8. A virtual keyboard system for receiving input from a human operator, comprising:
   a touchscreen for displaying a virtual keyboard comprising at least 26 representations of keyboard keys, each representing at least one letter in a standard alphabet, the touchscreen being capable of sensing a location of a contact by the human operator with the representation of the keyboard key;
   a processor; and
   a computer readable storage device having stored thereon computer readable instructions that, when executed by the processor, cause processor to, in response to receiving an indication of a contact on a representation of a first keyboard key, ignore indications of contact on other representations of keyboard keys, and determine the input from the human operator using an identity of the representation of the first keyboard key and a signal from the touchscreen indicative of a motion gesture;
   the motion gesture comprising a displacement of a position of the contact on the representation of the first keyboard key, the displacement beginning in a statically defined fixed null zone near a center of the representation of the first keyboard key and subsequently exiting the fixed null zone, the displacement ending in one of a plurality of quadrants surrounding and adjacent to the fixed null zone;
   the input from the human operator being determined as a character represented by the representation of the first keyboard key and modified in accordance with the one of the quadrants in which the displacement ends;
   the computer readable instructions further causing the processor to receive a signal from the touchscreen indicative of a second motion gesture comprising a second displacement of a position of a second contact, the second displacement beginning in the statically defined fixed null zone and subsequently exiting the fixed null zone, the second displacement ending in a second null zone adjacent the fixed null zone and separating radial edges of two adjacent quadrants of the quadrants surrounding the fixed null zone; and to ignore the indication of the second motion gesture based on the second displacement ending in the second null zone.

9. The virtual keyboard system of claim 8, wherein the motion gesture is a finger swipe in contact with the representation of the first keyboard key.

10. The virtual keyboard system of claim 9, wherein the finger swipe is an upward swipe, and determining the input from the human operator further comprises:
  based on the upward swipe, performing a SHIFT operation on a character represented by the representation of the first keyboard key.

11. The virtual keyboard system of claim 8, wherein the representation of the first keyboard key represents a space bar, the motion gesture is a swipe, and the input from the human operator is determined to be a tab command.

12. The virtual keyboard system of claim 8, wherein determining the input from the human operator further comprises:
  only upon determining that the motion gesture comprises a path beginning within a null zone near a center of the representation of the first key and remaining within the null zone, determining the input to be an unmodified character represented by the representation of the first key.

13. The virtual keyboard system of claim 8, wherein the virtual keyboard does not include a SHIFT key.

14. A non-transitory computer-usable medium having computer readable instructions stored thereon that, when executed by a processor, cause the processor to perform operations for receiving input from a human operator, the operations comprising:
  receiving an indication of contact of a finger on a representation of a first key of a virtual keyboard displayed on a touchscreen, including an indication of a position of the contact on the representation of the first key, the representation of the first key being one of a plurality of representations of keys of the virtual keyboard, each representing one or more of a plurality of characters;
  in response to receiving the indication of the contact of the finger on the representation of the first key, ignoring indications of contact on other representations of keys of the virtual keyboard;
  receiving an indication of a motion gesture comprising displacement of the position of the contact on the representation of the first key, the displacement beginning in a statically defined fixed null zone near a center of the representation of the first key and subsequently exiting the fixed null zone, the displacement ending in one of a plurality of quadrants surrounding and adjacent to the fixed null zone;
  determining the input from the human operator as a character represented by the representation of the first key and modified in accordance with the one of the quadrants in which the displacement ends;
  receiving an indication of a second contact;
  receiving an indication of a second motion gesture comprising a second displacement of a position of the second contact, the second displacement beginning in the statically defined fixed null zone and subsequently exiting the fixed null zone, the second displacement ending in a second null zone adjacent the fixed null zone and separating radial edges of two adjacent quadrants of the quadrants surrounding the fixed null zone; and
  ignoring the indication of a second motion gesture based on the second displacement ending in the second null zone.

15. The non-transitory computer-usable medium of claim 14, wherein the motion gesture is a finger swipe in contact with the representation of the first key.

16. The non-transitory computer-usable medium of claim 15, wherein the finger swipe is an upward swipe, and determining the input from the human operator using the identity of the representation of the first key and the indication of the motion gesture further comprises:
  based on the upward swipe, performing a SHIFT operation on a character represented by the representation of the first key.

17. The non-transitory computer-usable medium of claim 14, wherein receiving an indication of a motion gesture comprises receiving a signal from the touchscreen.

18. The non-transitory computer-usable medium of claim 14, wherein the representation of the first key represents a space bar, the motion gesture is a swipe, and the input from the human operator is determined to be a tab command.

19. The non-transitory computer-usable medium of claim 14, wherein determining the input from the human operator further comprises:
  only upon determining that the motion gesture comprises a path beginning within a null zone near a center of the representation of the first key and remaining within the null zone, determining the input to be an unmodified character represented by the representation of the first key.

20. The non-transitory computer-usable medium of claim 14, wherein the virtual keyboard does not include a SHIFT key.

* * * * *